United States Patent [19]

Kuge et al.

[11] Patent Number: 4,814,886
[45] Date of Patent: Mar. 21, 1989

[54] IMAGE PROCESSING PROCESS AND APPARATUS THEREFOR

[75] Inventors: Tsukasa Kuge, Tokyo; Takahiro Inoue, Yokohama; Yasushi Sato, Kawasaki; Akio Suzuki, Tokyo; Yoshihiro Murasawa, Kawasaki; Hiroshi Sasame, Yokohama; Jun Asai, Yokohama, all of Japan

[73] Assignee: Canon Kabushiki Kaisha, Tokyo, Japan

[21] Appl. No.: 213,513

[22] Filed: Jun. 28, 1988

Related U.S. Application Data

[63] Continuation of Ser. No. 841,513, Mar. 19, 1986, abandoned.

[30] Foreign Application Priority Data

| Mar. 20, 1985 [JP] | Japan | 60-54198 |
| Mar. 20, 1985 [JP] | Japan | 60-54199 |
| Mar. 20, 1985 [JP] | Japan | 60-54200 |

[51] Int. Cl.$^4$ .............................................. H04H 1/40
[52] U.S. Cl. ................................. 358/293; 358/298
[58] Field of Search ..................... 358/283, 298, 75

[56] References Cited

U.S. PATENT DOCUMENTS

| 3,197,588 | 7/1965 | Ernst | 358/283 |
| 3,757,036 | 9/1973 | Libbet et al. | 358/300 |
| 4,032,978 | 6/1977 | Wong | 358/283 |
| 4,149,183 | 4/1979 | Pellar et al. | 358/75 |
| 4,413,286 | 11/1983 | Boston | 358/283 |
| 4,419,691 | 12/1983 | Sing et al. | 358/75 |
| 4,553,173 | 11/1985 | Kawamura | 358/283 |
| 4,561,028 | 12/1985 | Tsuzuki | 358/283 |
| 4,635,078 | 1/1987 | Sakurada et al. | 358/75 |

FOREIGN PATENT DOCUMENTS

| 126782A1 | 5/1983 | European Pat. Off. |
| 132455A2 | 7/1983 | European Pat. Off. |
| 3207079 | 9/1982 | Fed. Rep. of Germany |
| 3408107 | 9/1984 | Fed. Rep. of Germany |
| 58-114570 | 7/1983 | Japan |
| 8102206 | 8/1981 | PCT Int'l Appl. |
| 1528377 | 10/1978 | United Kingdom |
| 2011759 | 6/1979 | United Kingdom |
| 1585971 | 3/1981 | United Kingdom |
| 2097217 | 10/1982 | United Kingdom |
| 2129250 | 12/1982 | United Kingdom |
| 2120896 | 12/1983 | United Kingdom |

OTHER PUBLICATIONS

Japanese Patent Abstract, vol. 7, No. 110(M-214) [1255], 58/29677.
Japanese Patent Abstract, vol. 6, No. 185(E-132) [1063], 57/99867.

*Primary Examiner*—Edward L. Coles, Sr.
*Attorney, Agent, or Firm*—Fitzpatrick, Cella, Harper & Scinto

[57] ABSTRACT

An image processing process forms a plural microdots for each pixel, and the number of microdots increases only in one direction for representing a higher density, thereby achieving an improved linearity in the density levels without sacrificing the resolving power.

12 Claims, 26 Drawing Sheets

FIG. 2A

| 1 | 9 | 3 | 11 |
|---|---|---|---|
| 13 | 5 | 15 | 7 |
| 4 | 12 | 2 | 10 |
| 16 | 8 | 14 | 6 |

FIG. 2B

| 7 | 8 | 9 | 10 |
|---|---|---|---|
| 6 | 1 | 2 | 11 |
| 5 | 4 | 3 | 12 |
| 16 | 15 | 14 | 13 |

FIG. 2C

| 13 | 6 | 10 | 14 |
|---|---|---|---|
| 9 | 1 | 2 | 7 |
| 5 | 4 | 3 | 11 |
| 16 | 12 | 8 | 15 |

FIG. 2D

| 11 | 5 | 7 | 9 |
|---|---|---|---|
| 13 | 1 | 3 | 15 |
| 8 | 10 | 12 | 6 |
| 4 | 16 | 14 | 2 |

| 1 | 4 | 7 | 10 | 13 | 16 | 19 | 22 | 25 | 28 | 31 | 34 | 37 | 40 | 43 |
|---|---|---|---|---|---|---|---|---|---|---|---|---|---|---|
| 17 | 20 | 23 | 26 | 29 | 32 | 35 | 38 | 41 | 44 | 2 | 5 | 8 | 11 | 14 |
| 33 | 36 | 39 | 42 | 45 | 3 | 6 | 9 | 12 | 15 | 18 | 21 | 24 | 27 | 30 |

FIG. 17

| 61 | 65 | 69 | 73 | 77 | 1 | 5 | 9 | 13 | 17 | 21 | 25 | 29 | 33 | 37 | 41 | 45 | 49 | 53 | 57 |
|---|---|---|---|---|---|---|---|---|---|---|---|---|---|---|---|---|---|---|---|
| 2 | 6 | 10 | 14 | 18 | 22 | 26 | 30 | 34 | 38 | 42 | 46 | 50 | 54 | 58 | 62 | 66 | 70 | 74 | 78 |
| 24 | 28 | 32 | 36 | 40 | 44 | 48 | 52 | 56 | 60 | 64 | 68 | 72 | 76 | 80 | 4 | 8 | 12 | 16 | 20 |
| 43 | 47 | 51 | 55 | 59 | 63 | 67 | 71 | 75 | 79 | 3 | 7 | 11 | 15 | 19 | 23 | 27 | 31 | 35 | 39 |

112 111

DISTANCE BETWEEN ARRANGEMENT LINES L

ℓ DISTANCE BETWEEN PIXEL GROWTH CORES

FIG. 32

| 1 | 10 | 19 | 22 | 25 | 4 | 13 | 28 → | 7 | 15 | 31 → |
|---|----|----|----|----|---|----|------|---|----|------|
| 5 | 14 | 29 → | | 8 | 16 | 32 → | | 2 | 11 | 20 | 23 | 26 |
| 9 | 17 | 33 → | | 3 | 12 | 21 | 24 | 27 | 6 | 18 | 30 → |

FIG. 33

| 1 | 4 | 7 | 10 | 13 | 16 | 19 | 22 | 25 → | 28 → |
| 17 | 20 | 23 | 26 → | | 29 → | | 2 | 5 | 8 | 11 | 14 |
| 30 → | | 3 | 6 | 9 | 12 | 15 | 18 | 21 | 24 | 27 → |

IMAGE PROCESSING PROCESS AND APPARATUS THEREFOR

This application is a continuation of application Ser. No. 841,513 filed Mar. 19, 1986, now abandoned.

BACKGROUND OF THE INVENTION

1. Field of the Invention

The present invention relates to an image processing process, for processing image signals and achieving tonal representation with dots, and an apparatus for executing said process.

2. Related Background Art

Dither processing and density pattern processing are often employed for representing an image including half tones by regulating the number of digital dots constituting the image. These processes represent different density levels by varying the number of printed dots in each small area, utilizing the integrating effect of human vision. In either process, an important factor in the representation of a half tone by the number of dots is the relation between the resolving power (or resolution) and the ability for tonal representation. More specifically, as regards the size of matrix, a larger matrix provides a larger number of density levels but reduces the resolving power. On the other hand, as regards the pattern type defining the mode of growth in the number of dots corresponding to an increasing density, the concentrated-dot type in which the dots increase around a central nucleus dot provides a better linearity of the density levels corresponding to the increasing number of dots, but tends to reduce the resolving power. In contrast, the dispersed-dot type does not substantially affect the resolving power but deteriorates the linearity between the number of dots and the density levels, resulting in a practical loss in the number of density levels.

FIGS. 2A to 2D illustrate already well-known matrix patterns. Numbers indicate the order of dot growth, and there is shown a state in which dots 1 to 8 are turned on. FIG. 2A shows an example of the dispersed-dot type, called a Bayer pattern. On the other hand, FIGS. 2B to 2D show examples of concentrated-dot patterns, respectively a spiral pattern, a modified spiral pattern and a screen dot pattern.

In an apparatus for printing or displaying with dots, each dot is generally designed with such a size that it slightly overlaps with the neighboring dots, in order to leave no background when all of the dots are printed or displayed. Consequently, in case of a dispersed-dot pattern, the linearity is deteriorated since the background is considerably covered in the course of an increase of dots. For attaining satisfactory tonal rendition and resolving power both in the dispersed-dot type and concentrated-dot pattern, there has been generally employed a method of reducing the matrix size and representing each dot in the matrix by a multi-level micropixel. Such a method corresponds, for example, in the laser beam printer, to intensity modulation or pulse width modulation.

More specifically, for example in a laser beam printer in which an image is recorded by optically scanning a photosensitive member, there are formed micropixels, or pixels divided in multiple levels in the scanning direction of the laser beam, by pulse width modulation in which the lighting period of the laser beam is controlled, or by intensity modulation in which the amount of irradiating light is controlled. Such micropixels can be obtained, in the case of a light-emitting-diode printer, by regulating the duration of light pulse or the intensity of the light-emitting diodes, or, in the case of a liquid crystal printer, by regulating the pulse duration of transmitted light or the amount of transmitted light. The size and form of the micropixels are controlled, in the case of the laser beam printer, in the main scanning direction, or the scanning direction of the laser beam, but, in the case of the light-emitting-diode printer or liquid crystal printer, in the sub-scanning direction.

However, in comparison with ordinary dots, the micropixels constituting a multi-level dot are smaller in size and tend to appear in less stable manner in printing. The size of the micropixel becomes unstable, for example, because of dot spreading in the case of ink jet printing or thermal transfer printing, or because of toner spreading or crushing in the case of electrophotographic process. Particularly, in the case of an electrophotographic printer, the developing electrostatic field of a micropixel is significantly affected by the state of surrounding pixels. The micropixel becomes smaller if there is a well-grown pixel in the vicinity, but becomes larger if there are no pixels therearound.

FIG. 4 shows a spiral type matrix in which each dot is varied in 5 levels. In FIG. 4, the matrix size is 3×3, and each dot is divided from 1 to 5, as shown in the central dot, and grow in the direction indicated by an arrow. However, such 3×3 matrix contains only one nucleus of growth and is unable to provide a sufficient resolving power.

SUMMARY OF THE INVENTION

An object of the present invention is to eliminate the above-explained drawbacks.

Another object of the present invention is to provide an improvement over processes for image processing for dot image formation and over an apparatus therefor.

Still another object of the present invention is to provide an image processing process, and an apparatus therefor, capable of reproducing an image with a high image quality.

Still another object of the present invention is to provide an image processing process, and an apparatus therefor, capable of reproducing an image which is faithful to an original image.

Still another object of the present invention is to provide an image processing process, and an apparatus therefor, capable of providing an excellent reproduced image with a simple structure.

The foregoing and still other objects of the present invention will become fully apparent from the following description to be taken in conjunction with the attached drawings and the appended claims.

BRIEF DESCRIPTION OF THE DRAWINGS

FIGS. 2A to 2D are views of conventional pattern matrixes;

FIG. 17 is a view showing another threshold value matrix;

FIGS. 32 to 34 are views of other threshold value matrixes; and

DETAILED DESCRIPTION OF THE PREFERRED EMBODIMENTS

Now the present invention will be clarified in greater detail by embodiments thereof shown in the attached drawings.

Figure 5:
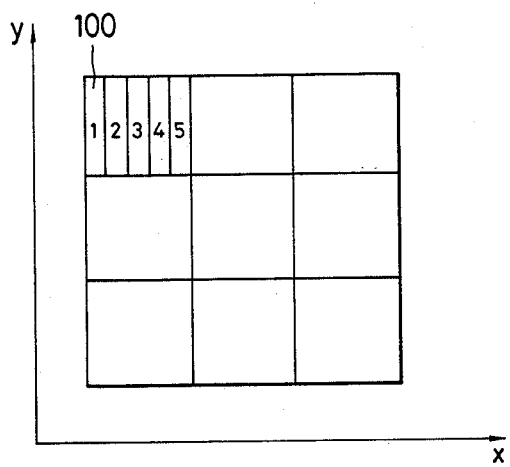
FIG. 5 is a view showing a method of pixel division in an embodiment of the present invention.

In said embodiments a pixel to be recorded is divided into plural micropixels. Thus, the entered data of a pixel is divided, according to the density level thereof, into plural microdots. FIG. 5 shows an example in which a pixel or a dot is divided into five micropixels or microdots 100, thus allowing six tonality levels to be represented. This process can be easily achieved, for example in a laser beam printer, by taking the x-axis in the main scanning direction of the laser beam and dividing the duration of light pulse in a pixel into 5 portions.

Figure 6A:
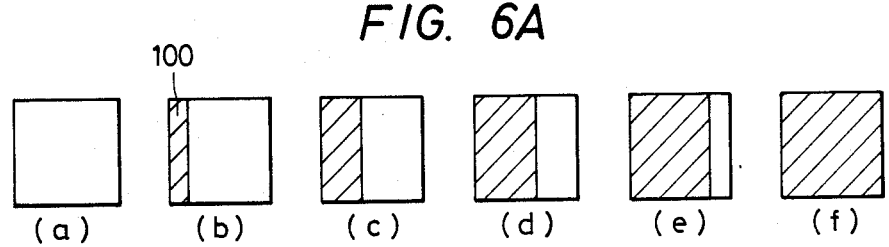
FIGS. 6A and 6B are views showing examples of micropixel arrangements in a pixel in said embodiment.
Figure 6B:
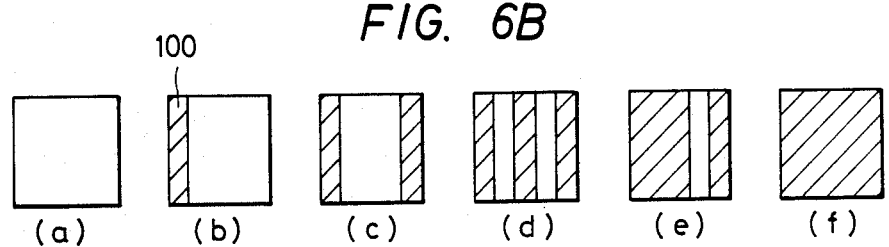

FIGS. 6A and 6B show, in case of a division of the pixel as shown in FIG. 5, different modes of increase of micropixels, in the order from (a) to (f).

Figure 7:
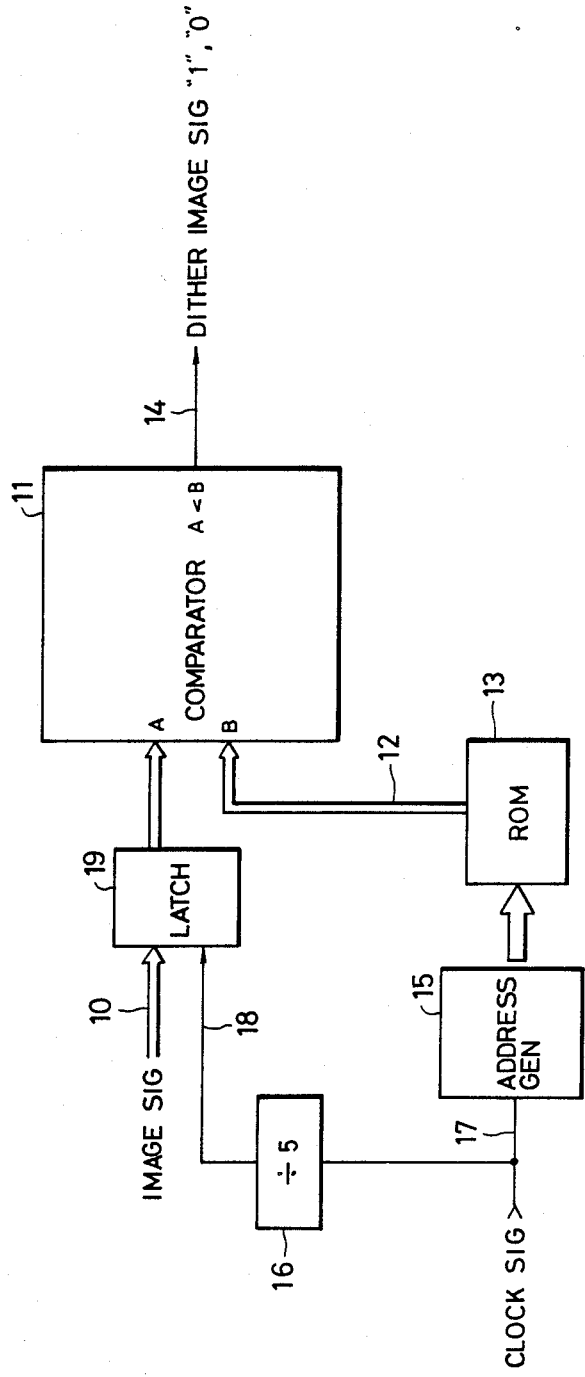
FIG. 7 is a block diagram of an image processing apparatus for said embodiment.

FIG. 7 is a block diagram of a dither image signal generating circuit, utilizing a dither process, wherein an image signal 10 representing an image density is latched by a latch 19, and is then supplied to a terminal A of a comparator 11, of which the other terminal B receives a threshold signal. According to address data generated by an address generator 15, a read-only memory (ROM) 13 storing dither threshold values generates, in cyclic manner, dither threshold values according to a systematic dither process. The comparator 11 compares the image signal 10 with the dither threshold value, and generates a binary dither image signal 14, of a value "1" or "0". In this case a pixel 101 is divided into five micropixels 100. Clock signals 17 are supplied to a frequency divider 16 to generate a latch signal 18 for every five clock signals. Thus the ROM 13 generates the threshold value signals 12 in synchronization with the clock signals 17, and the latch 17 releases the pixel data at every five clock signals.

The pixel data contain a determined number of bits per pixel, and may be obtained by reading an original image, for example, with a CCD and converting thus obtained analog data into digital image data by means of an A/D converter, or may be stored in advance in an electronic file or the like.

Figures 8, 9:
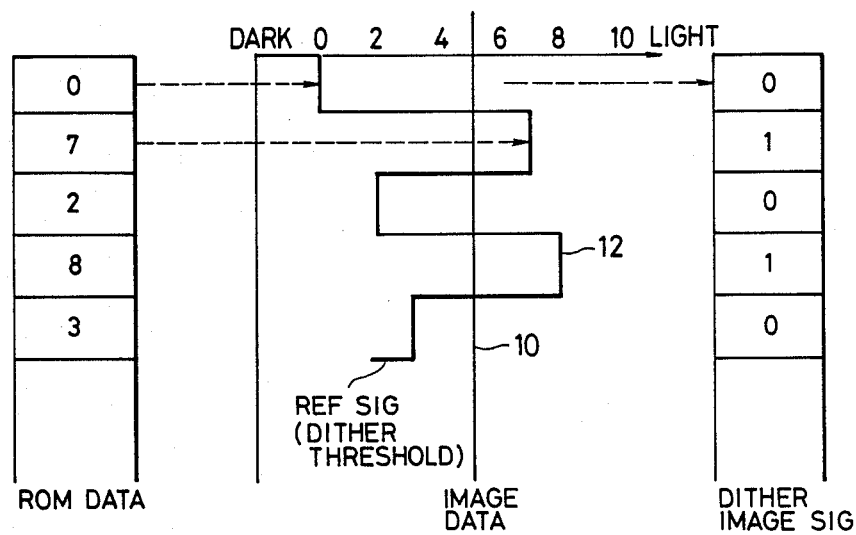
FIG. 8 is a chart showing the relation between ROM data and dither image signals.
FIG. 9 is a view showing a threshold value matrix of said embodiment.

FIG. 8 shows the relation between the dither threshold values 12 from the ROM 13 and the dither image signals 14. The dither image signal 14 assumes a value "1" when the image signal indicates a darker level than the threshold value 12.

Figure 1:
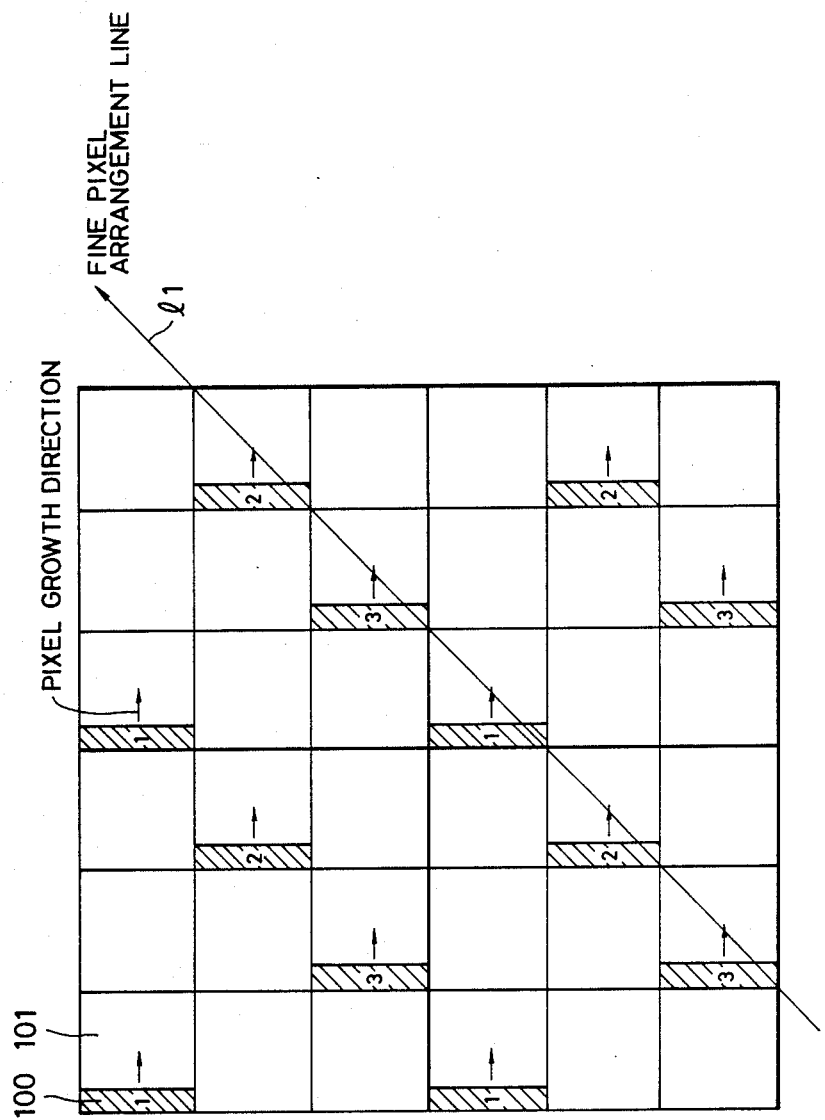
FIG. 1 is a schematic view showing the process of pixel growth in an embodiment of the present invention.
Figure 3:
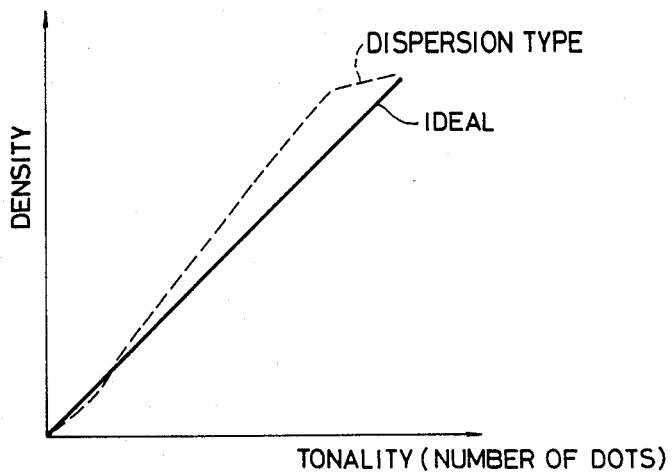
FIG. 3 is a chart showing the tonal characteristic of a dispersed-dot pattern.
Figure 4:
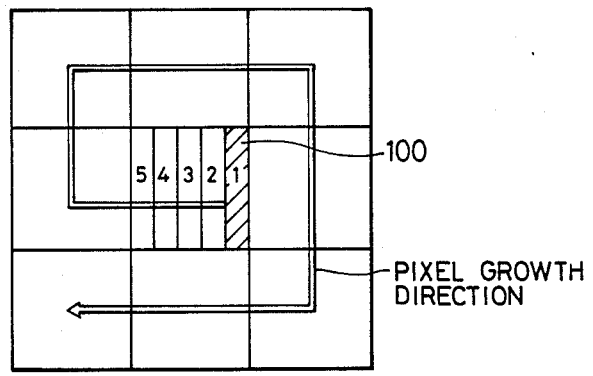
FIG. 4 is a view showing an example of a spiral pattern with hexa-level dots.

The output of an image including intermediate tone in the present embodiment is achieved by a dither matrix shown in FIG. 9. Figures in the matrix indicate the levels of threshold values, wherein a smaller figure represents a lower image density, and the dither image signal assumes a value "1" if the value of the pixel data is higher than said threshold value. Said matrix is capable of reproducing $3\times3\times5+1=46$ density levels. In the dither matrix of the present embodiment, the pixels are arranged along diagonal lines, and the figures are arranged in such a manner that the form of each pixel is varied by the change in the number of micropixels to represent intermediate tones. For a uniform image density less than "4", the micropixels (or fine pixels) 100 corresponding to the density "3" or less in the pixels are arranged diagonally, as shown in FIG. 1, to form very fine diagonal lines 11. In the present embodiment, the threshold values "1", "2" and "3" constitute nuclei of dot growth in the threshold value matrix.

Figure 10:
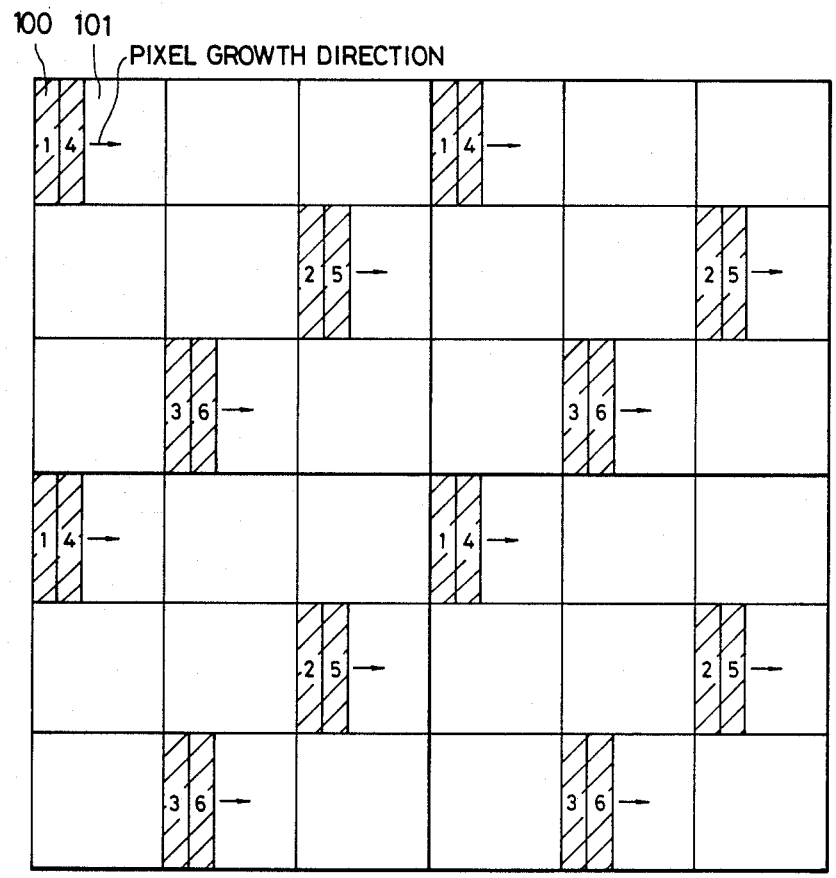
FIGS. 10 to 12 are schematic views showing the process of pixel growth in said embodiment.
Figure 11:
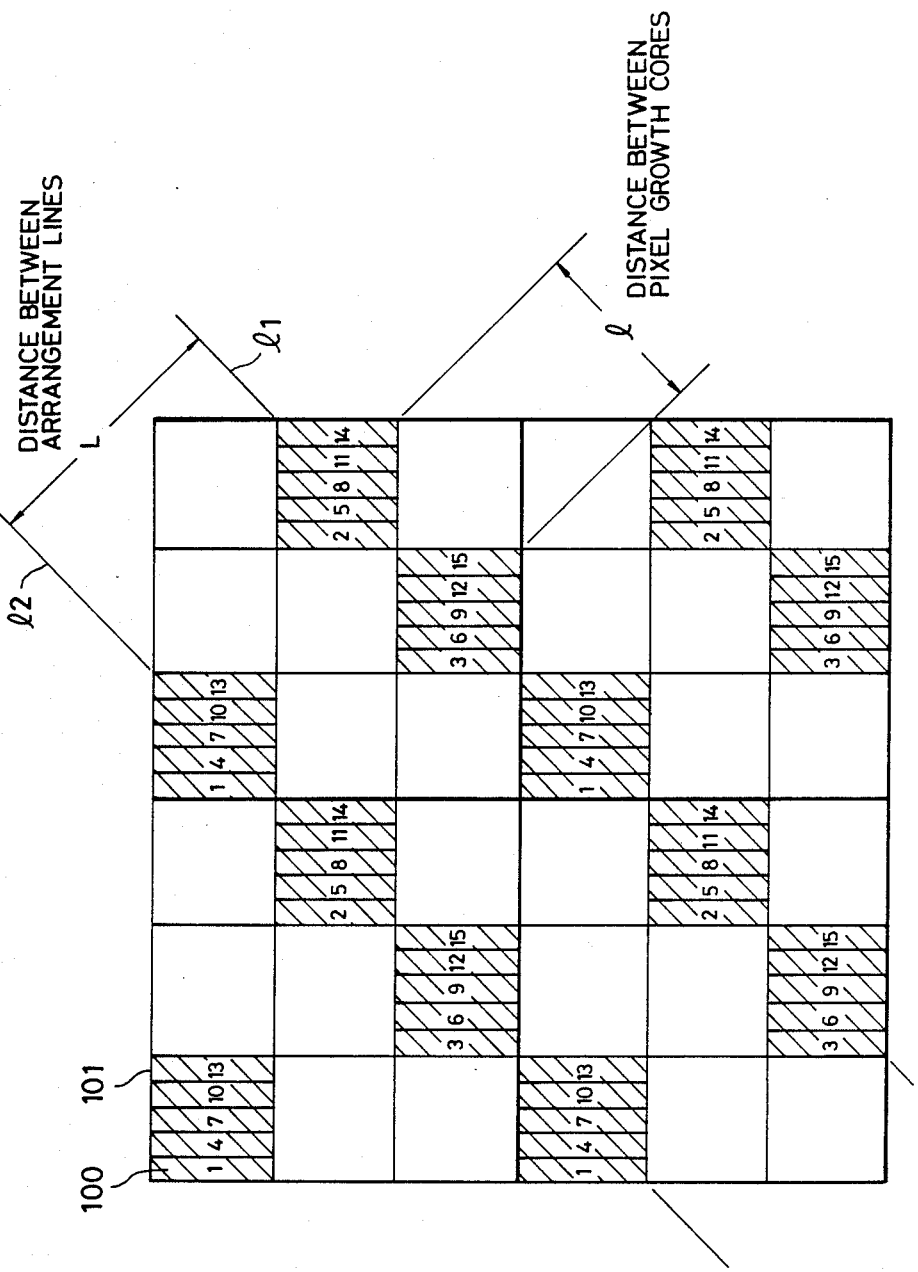
Figure 12:
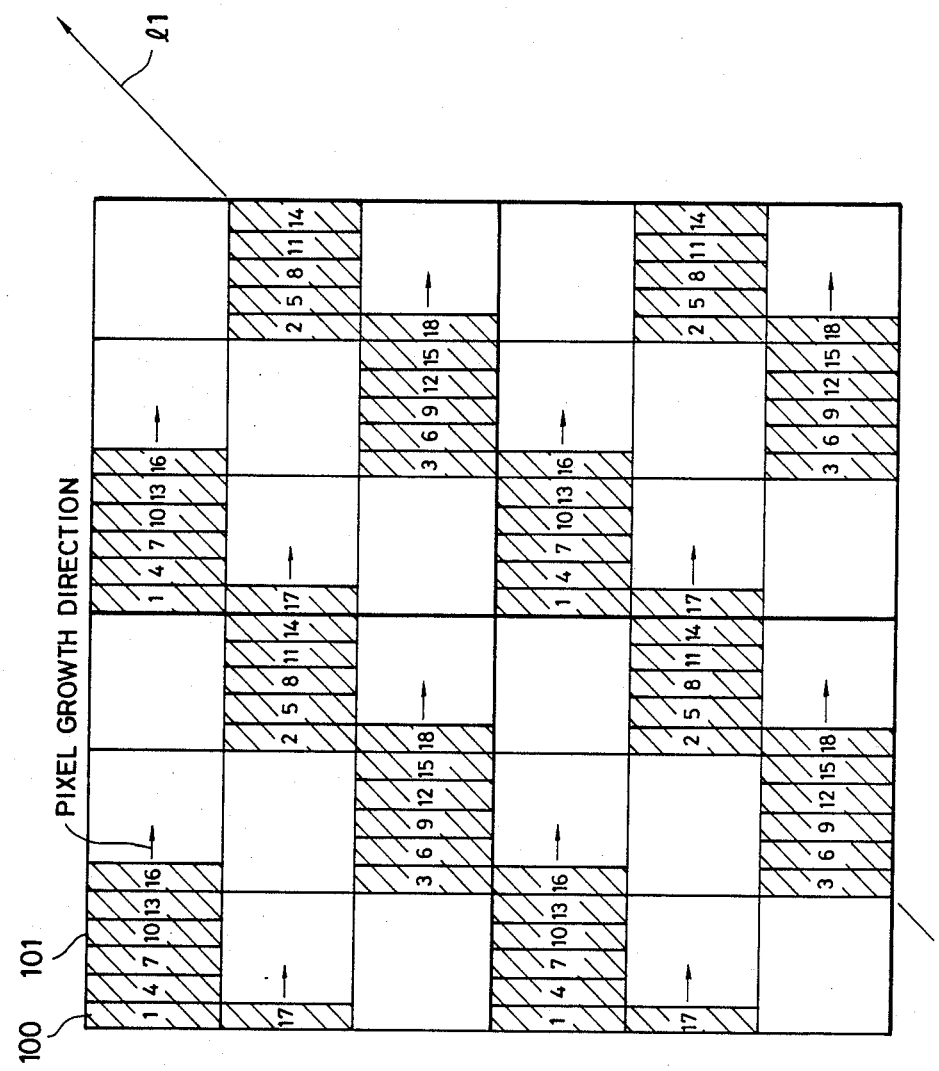

FIG. 10 shows the increase of micropixels 100 for a uniform image density of "6", and FIG. 11 shows the increase of micropixels for a uniform image density of "15". For an image density in a range from "15" to "18", the micropixels 100 further increase, as indicated by arrow in FIG. 12, from fully printed pixels, so that the lines 11 become thicker. It is to be noted that the pixels always grow in an array of plural lines of a regular interval, and are not placed outside said lines.

Such growth of pixels in linear arrays reduces the influence of surrounding pixels when the number of micropixels 100 is increased. As explained before, in electrophotographic image formation, the latent images of the pixels, if they are scattered, influence mutually in complex manner to alter the size of the pixels through slight changes in the latent image forming conditions and developing conditions. However, a linear array of the pixels as in the present embodiment allows to reduce the influence of surrounding latent images even when the micropixels increase, and an eventual influence is rendered stable since the surrounding latent images are in simple linear structures.

In this manner the present embodiment is capable of providing a stable tonal rendition, since the size of the micropixels 100 is not significantly affected by the surrounding pixels even when the micropixels 100 are added. Also, a sufficient resolving power is ensured since each matrix contains three nuclei of pixel growth. Furthermore, since each pixel is divided into the micropixels 100, a 3×3 matrix can provide $3\times3\times5+1=46$ density levels if each pixel is divided into five. The above-mentioned effect is found to be evident under a condition $L/l \geq 3/2$ wherein l is the distance between the nuclei of glowing pixels, and L is the distance between parallel lines l1 and l2 as shown in FIG. 11, and a designing satisfying the above-mentioned condition is therefore desirable.

Figure 13:
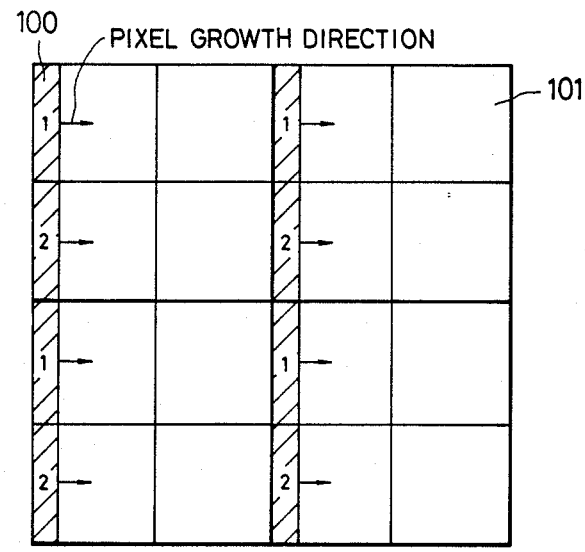
FIG. 13 is a schematic view showing the process of pixel growth in a vertical linear array of pixels.
Figure 14:
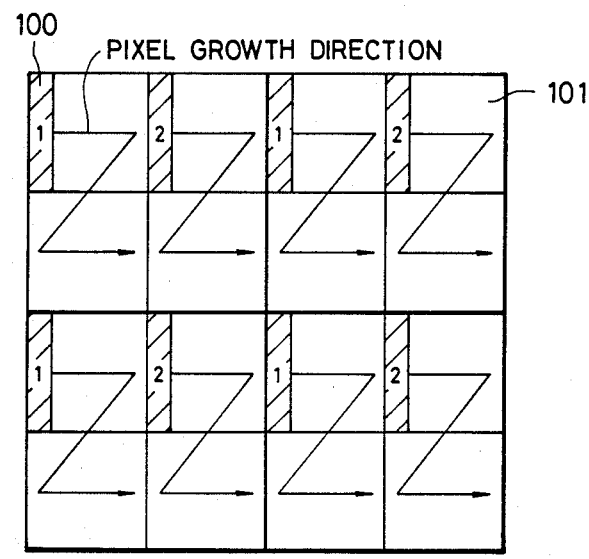
FIG. 14 is a schematic view showing the process of pixel growth in a horizontal linear array of pixels.

In addition to the above-explained diagonal linear arrays of pixels, they can also be arranged in vertical or horizontal linear arrays. FIG. 13 shows vertical linear arrays of pixels while FIG. 14 shows horizontal linear arrays of pixels, and arrows indicate the direction of pixel growth.

Figure 15:
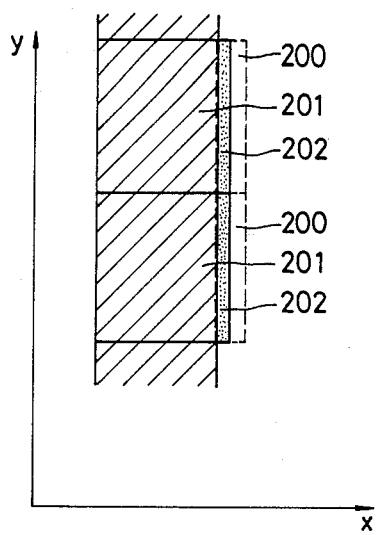
FIG. 15 is a view showing the state of micropixels in a vertical linear array of pixels.
Figure 16:
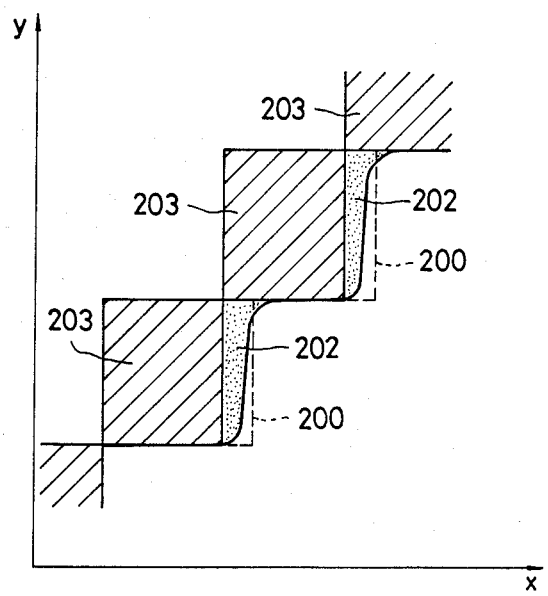
FIG. 16 is a view showing the state of micropixels in a diagonal array of pixels.

However, the present inventors have found, particularly in an electrophotographic recording apparatus, that a better tonal rendition can be obtained in diagonal linear arrays of pixels than in vertical or horizontal linear arrays of pixels, presumably because of following phenomenon. For example, in a vertical linear array of pixels as shown in FIG. 15, an added micropixel 200 provides a smaller developed image 202, due to attraction by a neighboring linear latent image 201. Consequently, an addition of a micropixel does not increase the density when the micropixel is made smaller. On the other hand, in a diagonal linear array of pixels as shown in FIG. 16, an added micropixel 200 provides a developed image area 202, not involving a decrease in area as in the case of FIG. 15, since the attraction in image development is divided in x- and y-directions by the neighboring pixels 203. Consequently, in such diagonal array of pixels, a faithful increase in density can be obtained by the addition of a micropixel even when the size of the micropixels is reduced. Consequently such diagonal linear arrays of pixels is superior in tonal rendition corresponding to the increase in number of micropixels.

In addition, the vertical or horizontal linear arrays may result in an uneven pitch of lines or a fluctuating thickness of lines due to an eventual unevenness in the scanning or the sheet feeding of the recording apparatus, and the diagonal linear array provides a more natural image since the vertical or horizontal stripe patterns appear more vividly to human vision.

Experiments conducted by varying angle between the scanning direction of the image recording apparatus and the direction or pixel array shown in FIG. 1 have revealed that better images can be obtained when the angle is in a range from 30° to 60°. Therefore, the direction of the linear array should preferably be designed in said range.

In the above-explained embodiment, the micropixels 100 in each pixel are increased as shown in FIG. 6A, but an increase of micropixels in scattered manner as shown in FIG. 6B is also included in the present invention if the pixels are arranged linearly and grow in linear clusters. Also, the number of divisions in each pixel is not limited to five but can be divided in any number of plural micropixels.

Figure 18:
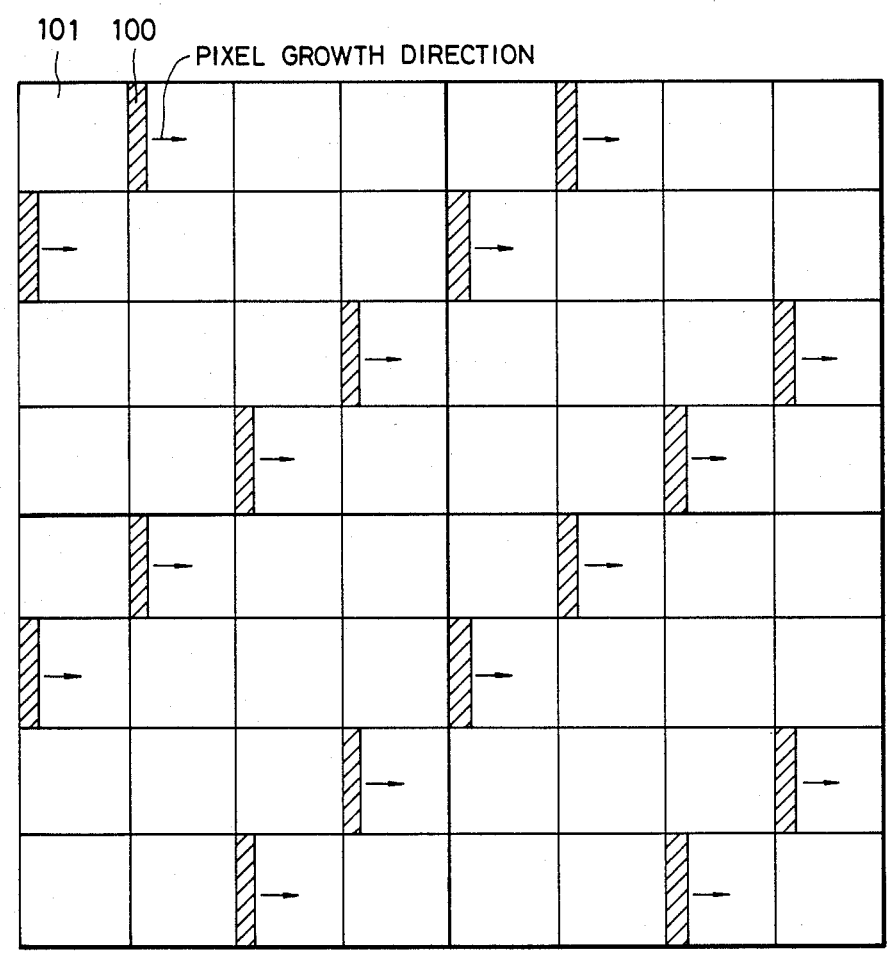
FIG. 18 is a view showing the process of pixel growth employing the threshold value matrix shown in FIG. 17.

Furthermore the present invention is not limited to the above-explained case employing a 3×3 matrix but includes any mode of representing intermediate tones by the form of linearly arranged pixels, regardless of the size of matrix. For example, for a 4×4 matrix, there can be employed a dither matrix as shown in FIG. 17. Also, in this case the pixels are arranged in diagonal lines as shown in FIG. 18 and grow as indicated by arrows.

Figure 19A:
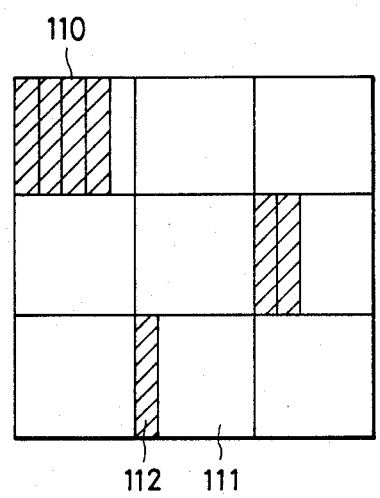
FIGS. 19A to 19E are views showing the process of nucleus growth of each dot.
Figure 19B:
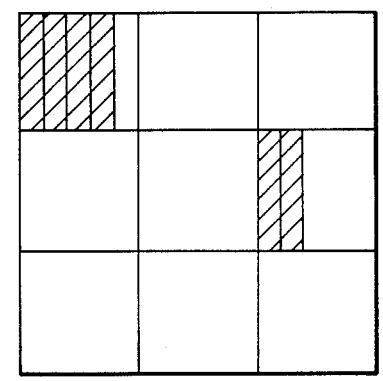
Figure 19C:
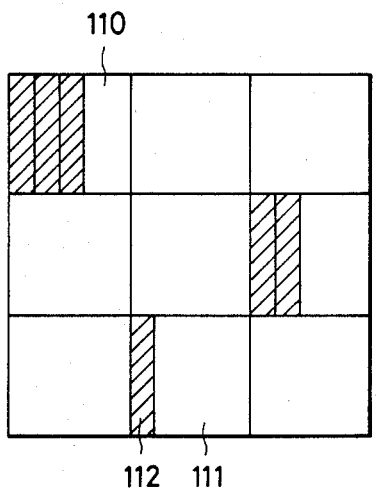
Figure 19D:
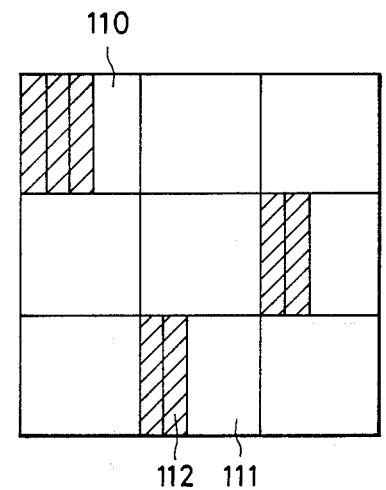
Figure 19E:
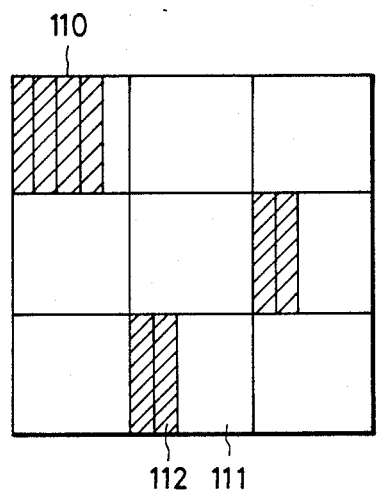

As explained before, the micropixels for representing multiple density levels are small in size and tend to be unstably printed if they are scattered. Particularly in case of a laser beam printer employing an electrophotographic process, the micropixel is significantly affected by the state of surrounding pixels. For example, as shown in FIG. 19A, if a pixel 110 is at the level "4" while a pixel 111 in a same matrix is at the level "1", the latter is scarcely printed by the influence of the former. Thus, in case of an addition of a micropixel 112 from the state of FIG. 19B to the state of FIG. 19A, two states in fact look alike since the micropixel 112 is scarcely printed, and a smooth tonal rendition cannot be expected in response to an increase in the density of image data. Stated differently, there cannot be obtained a linear relation between the number of dots and the density levels. It has, however, been discovered that a smooth tonal rendition can be obtained, in case of a growth from the state of FIG. 19C, by expanding the micropixel 112 at first as shown in FIG. 19D to bring the pixel to the level "2" and then expanding the pixel 110 to the level "4" as shown in FIG. 19E, so that the pixel 111 of the lowest level is always at least equal to 30% of the pixel 110 of the highest level. A particularly smooth tonal representation can be obtained by growing the micropixels 100 in the order of numbers shown in FIG. 9.

Linear arrays of plural pixel growth nuclei, which are parallel in one direction and are distanced regularly, can be achieved in various patterns as shown in the FIGS. 20 to 27. However, in case of image printing by an electrophotographic process, there should be considered following characteristics. In printing a pixel, dots (or lines) may become thicker due to the influence of latent image and image development. For example, in the case of a resolving power of 300 dots/inch, each dot is printed in an approximate size of 100 to 120 μm, while the distance between neighboring pixels is about 85 μm. Consequently, unless the distance L between the linear arrays of the glowing nuclei is at least equal to 1.5 times of the distance l between the growing pixel nuclei, the background is completely filled with dots at an intermediate density level and the tone representation becomes no longer available. For example, in case of FIG. 28 corresponding to a distance ratio of 1.25 times, the neighboring lines 200, 201 mutually overlap in the course of growth of nuclei 202, 203 arranged on said lines.

Figure 24:
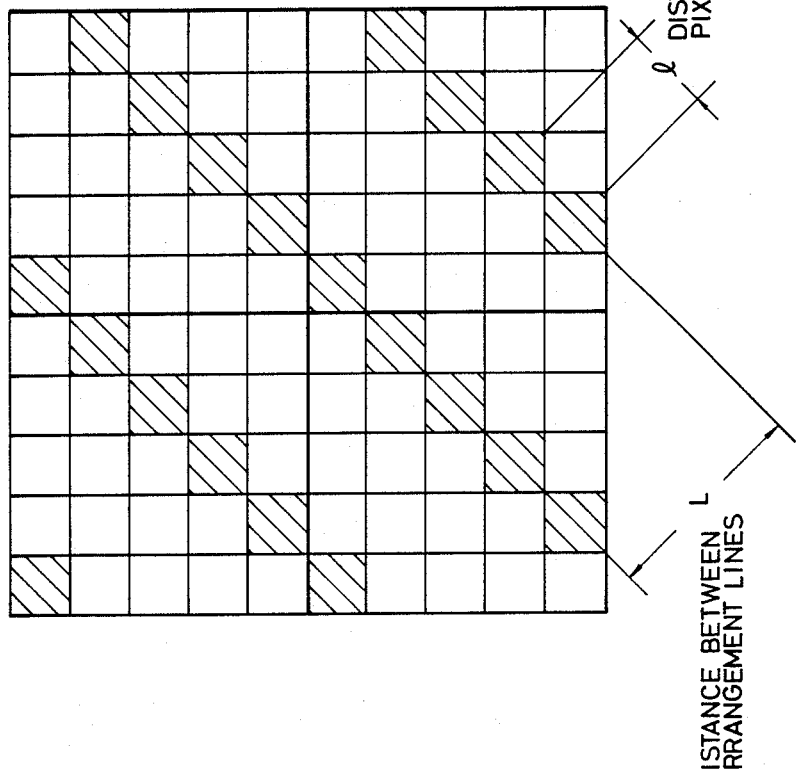
Figure 25:
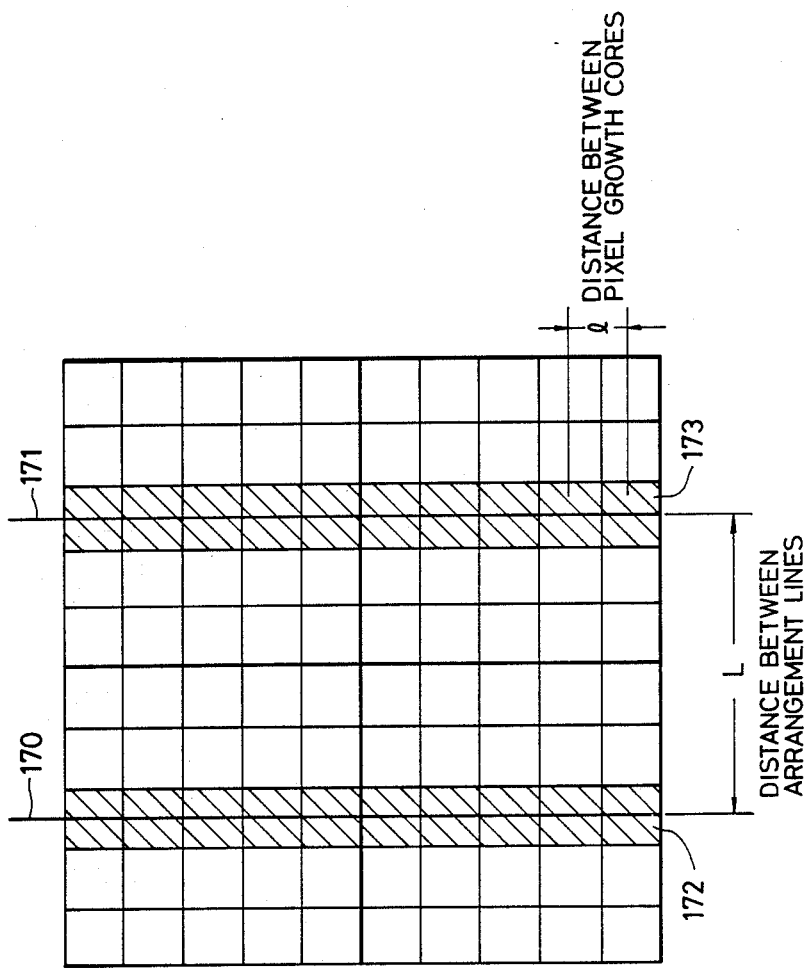

On the other hand, as shown in FIG. 25, if growing nuclei 172, 173 are arranged on widely distanced lines 170, 171, the area occupied by dots becomes smaller to provide a tonal rendition only in a low density range. Also, the image will appear unnatural since the lines 170, 171 can be clearly distinguished even with the naked eye. Experiments have shown that the distance L between the linear arrays should preferably less than twice of the distance l between nuclei. As will be understood from FIGS. 20 to 27, there is most preferred a condition:

$$2 > L/l \geq 1.5$$

wherein l is the distance between the growing pixel nuclei, while L is the distance between the linear arrays.

Tab. 1 summarizes the values of ratio L/l in the illustrated patterns.

TABLE 1

Figure 20:
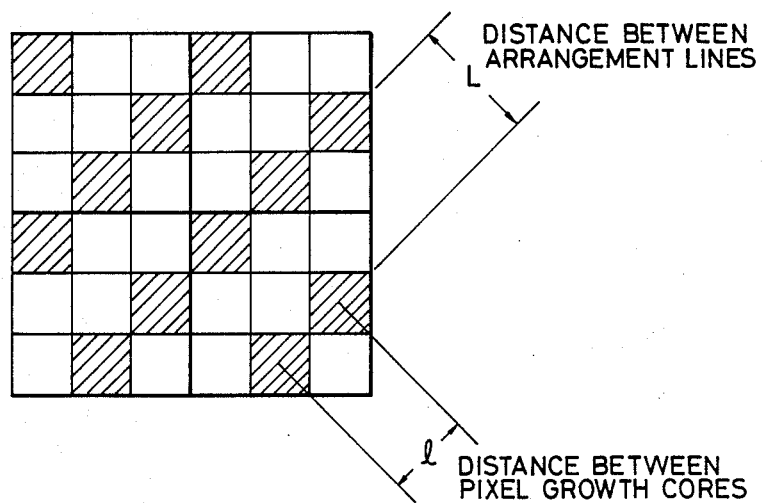
FIGS. 20 to 28 are views showing patterns of dot arrangment in matrixes of different sizes.
Figure 21:
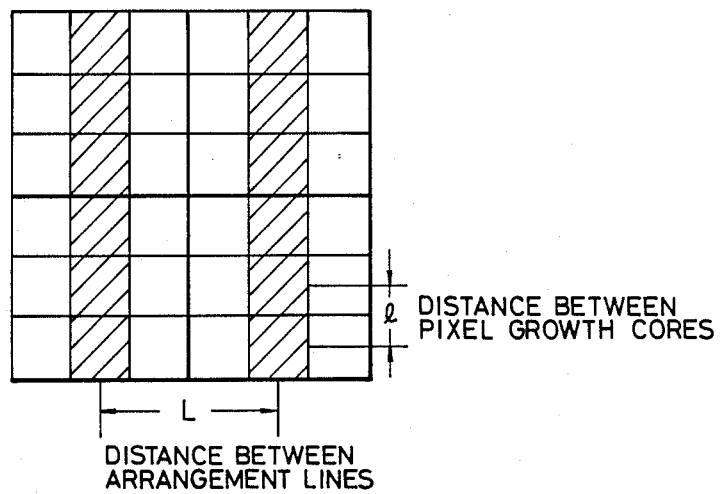

| Matrix size | Pattern | Drawing | L/l |
|---|---|---|---|
| 3 × 3 Pixels | diagonal | FIG. 20 | 1.5 |
| 3 × 3 Pixels | vertical | FIG. 21 | 3 |

TABLE 1-continued

Figure 22:
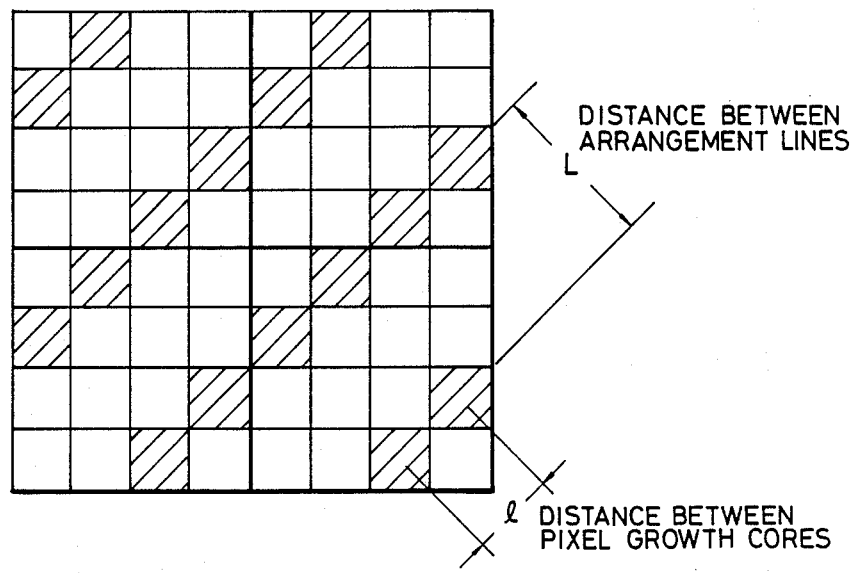
Figure 23:
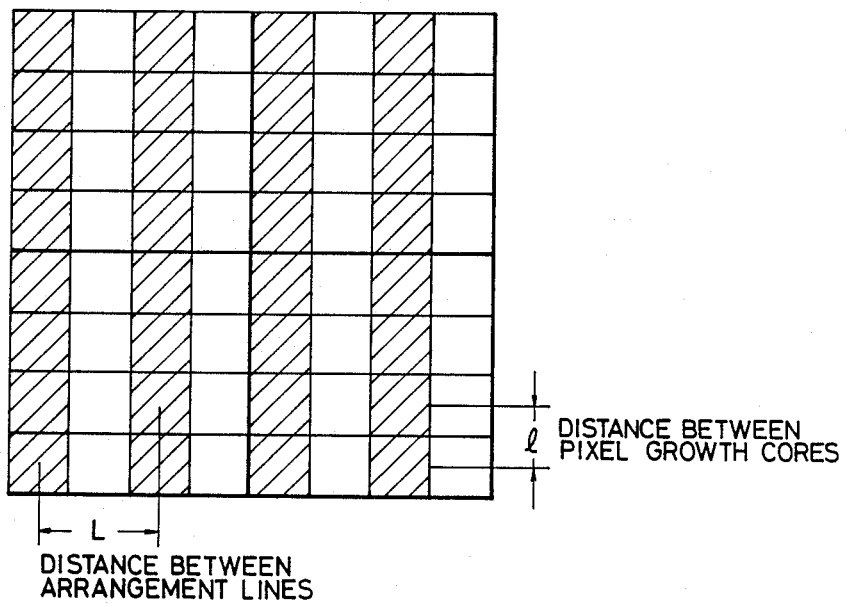
Figure 26:
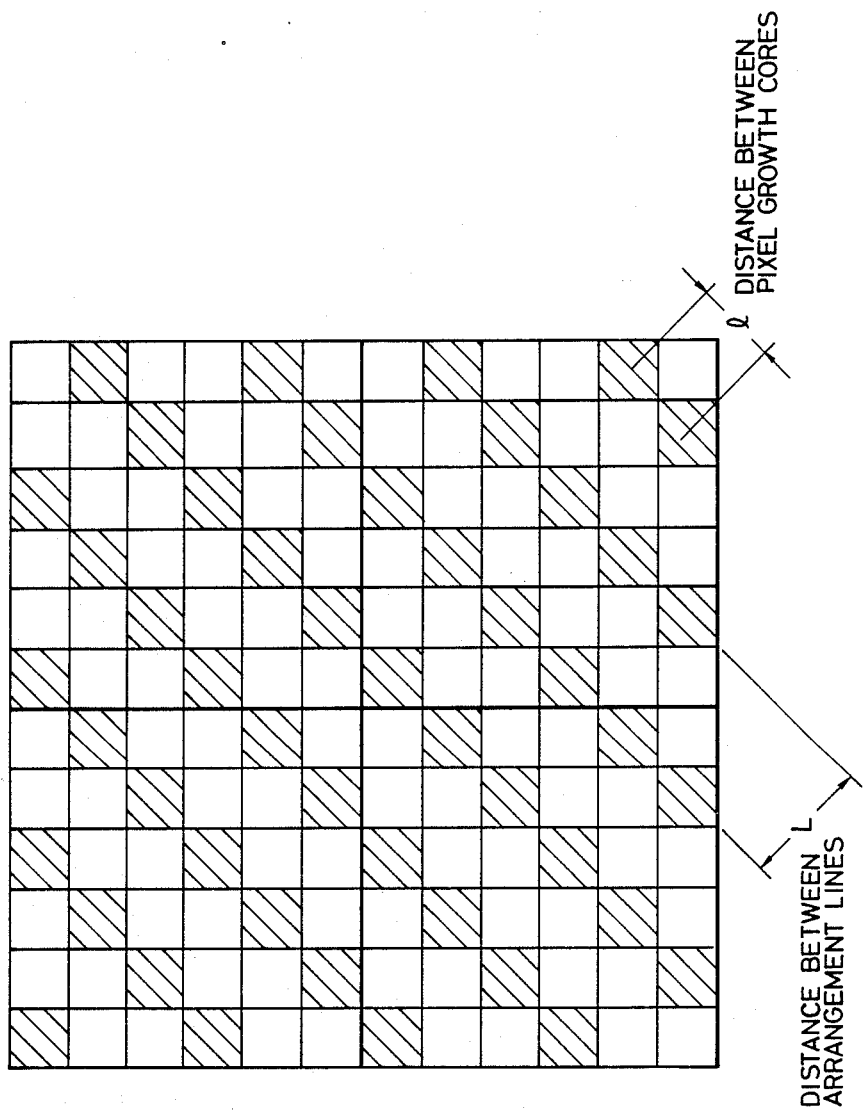
Figure 27:
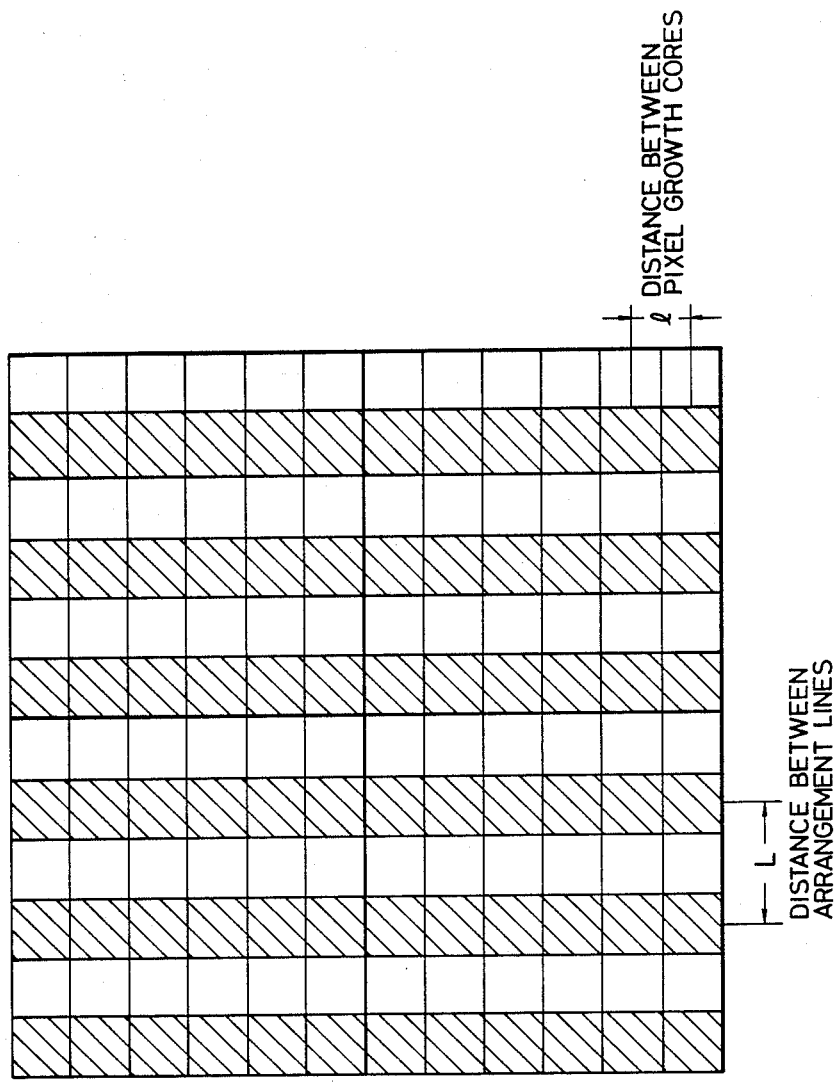
Figure 28:
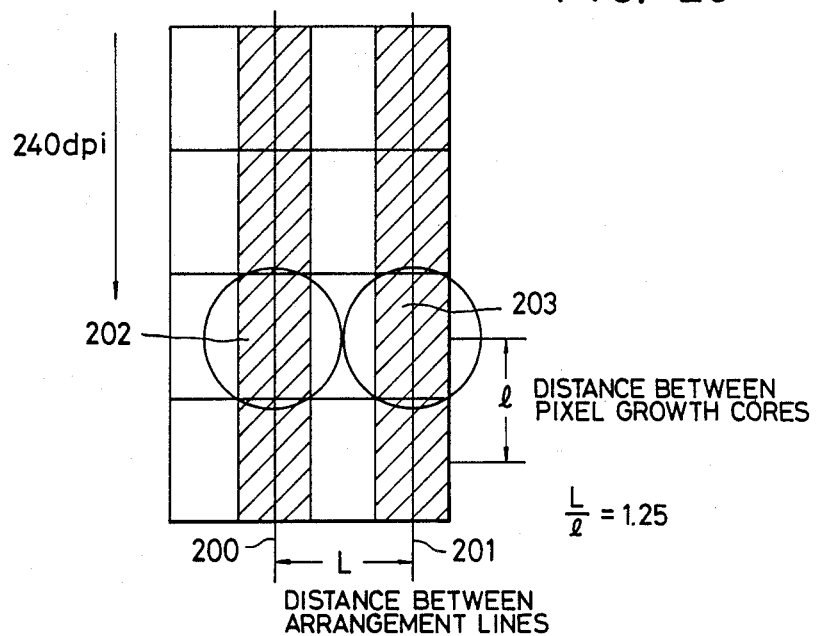

| Matrix size | Pattern | Drawing | L/l |
|---|---|---|---|
| 4 × 4 Pixels | diagonal | FIG. 22 | 2 |
| 4 × 4 Pixels | vertical | FIG. 23 | 2 |
| 5 × 5 Pixels | diagonal | FIG. 24 | 2.5 |
| 5 × 5 Pixels | vertical | FIG. 25 | 5 |
| 6 × 6 Pixels | diagonal | FIG. 26 | 1.5 |
| 6 × 6 Pixels | vertical | FIG. 27 | 2 |

Thus, the optimum value of L/l can be obtained in diagonal patterns with 3n×3n pixels, in which n is an integer.

Since the matrix size should be smaller for improving the resolving power, the diagonal pattern with a 3×3 matrix, shown in FIG. 20, is considered most effective. In this manner an image with satisfactory tonal rendition and satisfactory resolving power can be obtained by the use of 3×3 matrix in which the nuclei are arranged along diagonal lines.

The present invention is not limited to the above-explained embodiment but is also applicable to the case of intermediate tone reproduction by density pattern process in which data of a pixel are correlated with all the threshold values in the matrix.

Though the foregoing embodiment has been limited to the case of a laser beam printer, the present invention is similarly applicable to a liquid crystal printer or a light-emitting-diode printer in which micropixels can be formed by dividing the duration of a light pulse in a pixel.

Also in the foregoing embodiment each pixel is given multiple density levels by forming micropixels by means of dividing the lighting time for a pixel, but such multiple levels in a pixel can also be obtained by controlling the intensity of laser beam in the case of a laser beam printer, or the intensity of light in the case of a light-emitting-diode printer, or the amount of transmitted light in the case of a liquid crystal printer.

In the following there will be explained another embodiment of the present invention.

Figure 30:
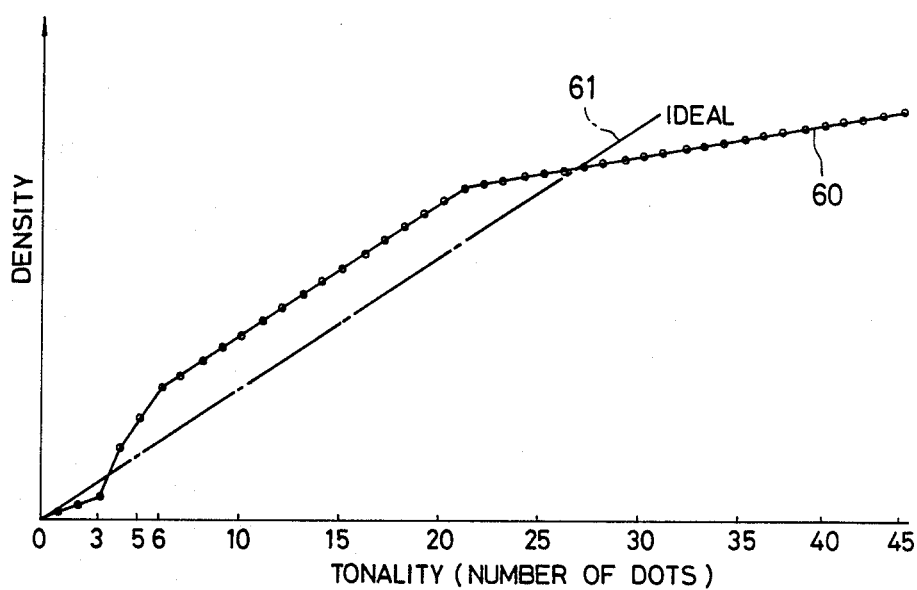
FIG. 30 is a chart showing the relation between the image density of the pattern shown in FIG. 9 and the number of dots.

In a detailed investigation of the above-explained image output process, the present inventors have found that the matrix shown in FIG. 9 provides a relation between the output image density and the tonality as shown by a solid curve in FIG. 30, with certain abeerations from an ideal line 61 in a low-density range and a high-density range, presumably due to the following reasons. In the low-density range, the aberration is presumably due to a fact that a single micropixel is less satisfactorily printed in comparison with continuous plural micropixels due to the start-up characteristic of the printing means, and this phenomenon is more marked when the number of micropixels constituting a pixel increases.

In order to eliminate the incluence of the start-up characteristic of the printing means, each micropixel can be made larger to a size not affected by such characteristic, but such solution will deteriorate the tonal rendition as the number of micropixels constituting a pixel has to be decreased.

On the other hand, in the high-density range, the aberration is presumably due to the over-lapping of dots, and the influence of surrouding pixels in the use of an electrophotographic process.

Figure 29:
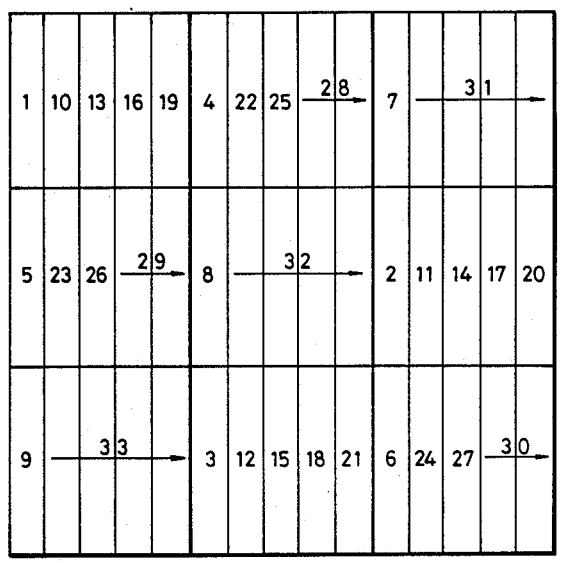
FIG. 29 is a view of a threshold value matrix of another embodiment.
Figure 31:
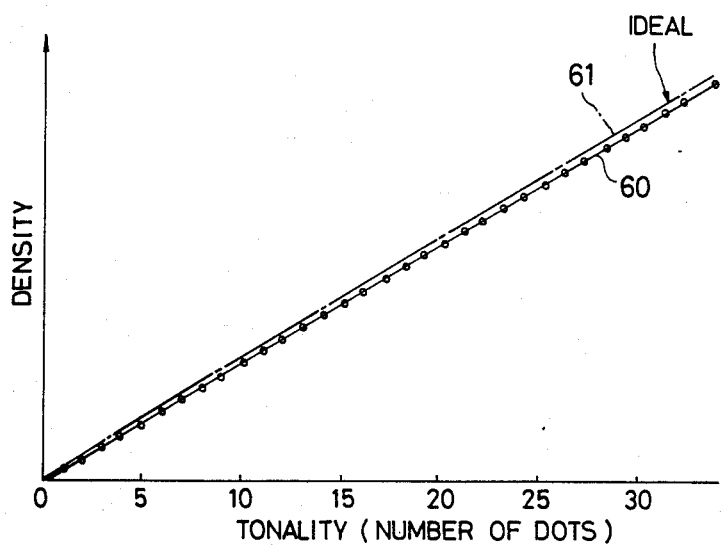
FIG. 31 is a chart showing the relation between the image density and the number of density levels in case of employing the matrix shown in FIG. 31.

FIG. 29 shows a threshold value matrix in another embodiment. In this embodiment, the micropixels are dispersed over the entire pixel in the low density range (level 0-9), then are arranged in plural linear arrays which are parallel in a direction and are regularly distance in the medium-density range (level 10-27), and are arranged in plural clusters, composed of two or four micropixels in this case, in the high-density range (level 28-33). In this manner there can be obtained a linear tonal rendition, as shown in FIG. 31, represented by a line 60 close to the ideal line 61, particularly with an improved tonal rendition in the low-density area.

FIG. 32 shows a matrix of another embodiment of the present invention, wherein the micropixels are dispersed in the density levels 1-18, then arranged in linear arrays in the levels 19-27 and finally arranged in plural clusters in the levels 28-33, thus providing a smoother tonal rendition than the case of FIG. 29.

In the present embodiment, the linearity of tonal rendition is attained by dispersed arrangement of micropixels (step 1), concentrated linear arrangement (step 2), and plural clustered arrangement (step 3), but, in certain cases, a sufficient linearity can be obtained by the compination of the steps S1 and S3, or of the steps S2 and S3.

Figure 34:
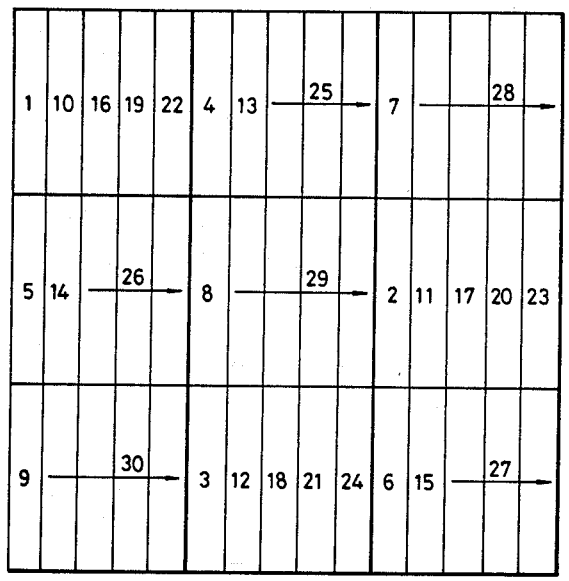

FIG. 33 shows a matrix in which the step 2 (levels 1-24) and step S3 (levels 25-30) are combined, while FIG. 34 shows a matrix in which the step S1 (levels 1-23) and step S3 (levels 24-29) are combined.

In these embodiments, best images can be obtained when the switchover from the step S1 to the step S2 and that from the step S2 to the step S3 are respectively selected below 20% of the maximum density and above 50% thereof.

In these embodiments the matrix has 3×3 pixels and each pixel is divided into five micropixels, but the present invention is not limited to such case.

Figure 35:
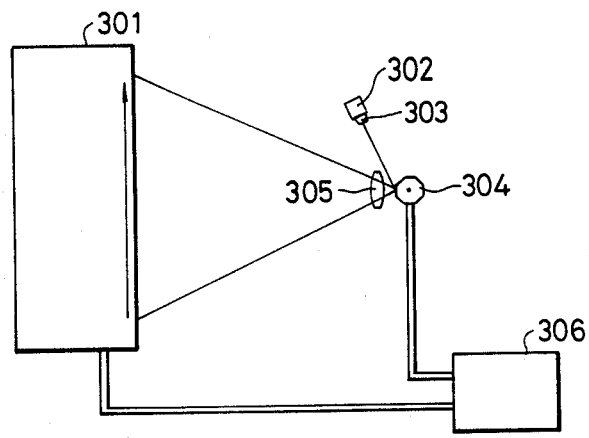
FIGS. 35 and 36 are schematic views of a laser beam printer in which the present invention is applicable.
Figure 36:
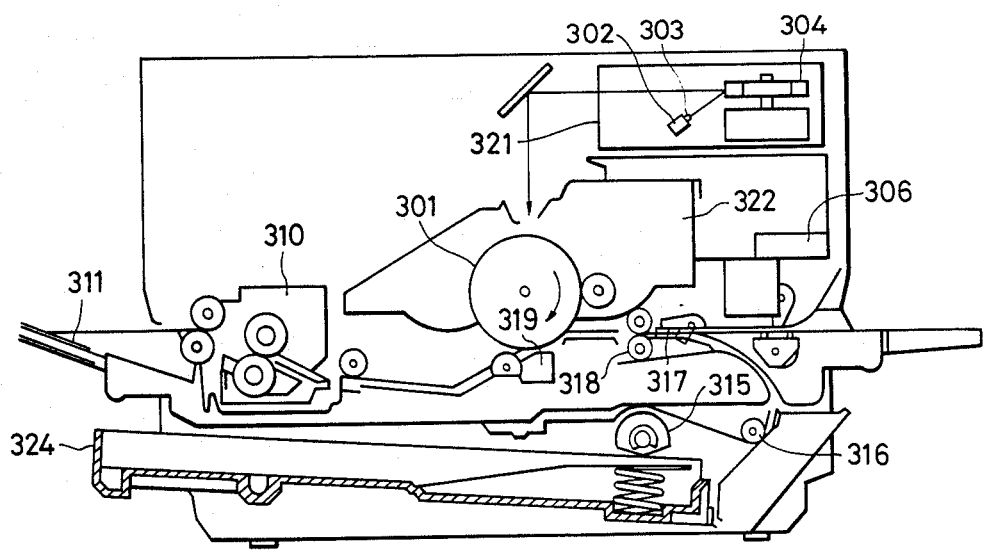

FIGS. 35 and 36 illustrate a laser beam printer in which the present invention is applicalble, wherein there are shown a photosensitive drum 301 for forming an electrostatic latent image; a laser unit 302 for emitting a laser beam; a collimating lens 303; a polygon mirror 304 for deflecting the emitted laser beam; an imaging lens 305; and a controller 306 for controlling the photosensitive drum 301, polygon mirror 304 etc.

In FIG. 36, an exposure unit 321 is provided with the scanner 304, laser unit 302 etc. shown in FIG. 35. A developing unit 322 develops the latent image, formed on the photosensitive drum 301 by the laser beam, into a visible image. A sheet feed roller 315 advances sheets one by one, from a sheet cassette 324 to a transport roller 316. A registration shutter 317 temporarily stops the sheet advanced by the transport roller 316, for synchronizing the sheet advancement with the laser beam irradiation and with the rotation of the photosensitive drum 301. There are provided also a feed roller 318 for feeding the sheet to a transfer unit 319; a fixing unit 310 for fixing a toner image transferred onto the sheet, and a stacker 311 for receiving the discharged sheets.

In the above-explained laser beam printer, the sequence controller 306 controls the timing of functions of sheet transportation, image development, et cetera. In said laser beam printer, there is provided an unrepresented driver for turning the laser beam on and off in response to binary pulse width modulated signals emitted by the comparator 11 shown in FIG. 7, thereby forming a visible image on the photosensitive drum 301.

The present invention is not limited to the foregoing embodiments but is subject to variations and modifications within the scope and spirit of the appended claims.

What is claimed is:

1. An image processing apparatus comprising:
   pixel data input means; and
   process means for processing the pixel data entered from said input means and generating reproduction signals for dot formation,
   wherein said process means generates reproduction signals in such a manner that a plurality of microdots are formed for each pixel data and sets of the plurality of microdots constitute lines slanted with respect to a dot recording direction, and wherein said process means generates the reproduction signals in such a manner that the plurality of microdots increases only in a direction relating to the recording direction in response to an increase in a density level of the input pixel data.

2. An image processing apparatus according to claim 1, wherein said process means is adapted to process the input pixel data by means of a determined threshold value matrix for generating binary signals as the reproduction signals.

3. An image processing apparatus according to claim 2, further comprising means for modulating a light beam, thereby forming a latent image on a photosensitive member, in response to the binary signals.

4. An image processing apparatus according to claim 3, wherein said latent image forming means comprises deflecting means for scanning the photosensitive member with the light beam.

5. An image processing apparatus according to claim 1, wherein the lines form an angle in the range from 30° to 60° with respect to the direction of increase of the plurality of microdots.

6. An image processing apparatus according to claim 2, wherein said threshold value matrix has an array of threshold values corresponding to plural input pixel data, and has plural threshold values corresponding to each pixel data.

7. An image processing apparatus comprising:
   pixel data input means; and
   means for processing the pixel data entered from said input means by using a predetermined threshold matrix and for generating binary signals for dot formation,
   wherein said process means generates binary signals in such a manner as to form a plurality of microdots for each pixel data and in such a manner that sets of the plurality of microdots constitute lines slanted with respect to a dot recording direction, and
   wherein the predetermined threshold matrix comprises a plurality of thresholds to be nuclei for constituting the lines and wherein the thresholds are arranged in such a manner that the plurality of microdots increases only in one direction relating to the recording direction on the basis of each of the nuclei in response to an increase in a density level of the input pixel data.

8. An image processing apparatus according to claim 7, wherein the lines form an angle in the range of from 30° to 60° with respect to the direction of increase of the plurality of microdots.

9. An image processing apparatus according to claim 7, further comprising means for modulating a light beam, thereby forming a latent image on a photosensitive member, in response to the binary signals.

10. An image processing apparatus according to claim 7, wherein said threshold value matrix has an array of threshold values corresponding to plural input pixel data, and has plural threshold values corresponding to each pixel data.

11. An image processing apparatus according to claim 10, wherein said threshold value matrix has such an arrangement that plural threshold values for first pixel data are different from those for second pixel data.

12. An image processing process comprising the steps of:
    entering pixel data into an image processing apparatus;
    digitally processing the entered pixel data and generating binary signals to form a plurality of microdots for each pixel data; and
    generating the binary signals in such a manner that sets of the plurality of microdots to be formed constitute lines slanted with respect to a dot recording direction, and in such a manner that the plurality of microdots to be formed increases only in one direction in response to an increase in a density level of the entered pixel data.

* * * * *